US012715963B2

(12) United States Patent
Minkwitz et al.

(10) Patent No.: US 12,715,963 B2
(45) Date of Patent: Aug. 25, 2026

(54) COPOLYAMIDE AND POLYMER FILM CONTAINING AT LEAST ONE DIAMINE, A DICARBOXYLIC ACID AND 1,5-DIAMINO-3-OXAPENTANE

(71) Applicant: BASF SE, Ludwigshafen am Rhein (DE)

(72) Inventors: Rolf Minkwitz, Ludwigshafen am Rhein (DE); Florian Richter, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 323 days.

(21) Appl. No.: 18/691,912

(22) PCT Filed: Sep. 6, 2022

(86) PCT No.: PCT/EP2022/074684
§ 371 (c)(1),
(2) Date: Mar. 14, 2024

(87) PCT Pub. No.: WO2023/041368
PCT Pub. Date: Mar. 23, 2023

(65) Prior Publication Data

US 2024/0376265 A1 Nov. 14, 2024

(30) Foreign Application Priority Data

Sep. 17, 2021 (EP) .................................... 21197339

(51) Int. Cl.

| | |
|---|---|
| ***C08G 69/26*** | (2006.01) |
| ***B29C 48/00*** | (2019.01) |
| ***B29C 48/08*** | (2019.01) |
| ***B29K 77/00*** | (2006.01) |
| ***B29K 105/00*** | (2006.01) |
| ***B29L 7/00*** | (2006.01) |
| ***C08G 69/28*** | (2006.01) |
| ***C08J 5/18*** | (2006.01) |

(52) U.S. Cl.
CPC ........... *C08G 69/265* (2013.01); *C08G 69/28* (2013.01); *C08J 5/18* (2013.01); *B29C 48/0018* (2019.02); *B29C 48/08* (2019.02); *B29K 2077/00* (2013.01); *B29K 2105/0085* (2013.01); *B29K 2995/0053* (2013.01); *B29K 2995/0097* (2013.01); *B29L 2007/002* (2013.01); *C08J 2377/06* (2013.01)

(58) Field of Classification Search
CPC ............................. C08G 69/265; C08L 77/06
See application file for complete search history.

(56) References Cited

U.S. PATENT DOCUMENTS

| | | | | |
|---|---|---|---|---|
| 4,387,184 | A | 6/1983 | Coquard et al. | |
| 5,888,597 | A | 3/1999 | Frey et al. | |
| 5,989,697 | A | 11/1999 | Gebben | |
| 2019/0194392 | A1* | 6/2019 | Minkwitz | C08G 69/14 |
| 2022/0153998 | A1* | 5/2022 | Sabard | C08L 77/04 |

FOREIGN PATENT DOCUMENTS

| | | | | |
|---|---|---|---|---|
| DE | 2846596 | A1 | 5/1979 | |
| EP | 0352562 | A2 | 1/1990 | |
| EP | 0761715 | A1 | 3/1997 | |
| WO | 2017/005812 | A1 | 1/2017 | |
| WO | 2018/050487 | A1 | 3/2018 | |
| WO | 2018/050488 | A1 | 3/2018 | |
| WO | WO-2020188203 | A1 * | 9/2020 | C08L 77/06 |

OTHER PUBLICATIONS

European Search Report for EP Patent Application No. 21197339.1, Issued on Mar. 18, 2022, 4 pages.
International Preliminary Report on Patentability received for PCT Patent Application No. PCT/EP2022/074684, mailed on Mar. 28, 2024, 6 pages.
Kirk Cantor, "Extruder Hardware Systems", Blown Film Extrusion, Edition2, 2011, pp. 37-38.
Mark, et al., "Films", Encyclopedia Of Polymer Science And Engineering, vol. 7, Edition 2, 1987, pp. 73-127.
Mark, et al., "Packaging Materials", Encyclopedia Of Polymer Science And Engineering, vol. 10, 1987, pp. 684-695.
Winston, et al., "Saturated Solutions For the Control of Humidity in Biological Research", Ecology, vol. 41, Issue1, Jan. 1, 1960, pp. 232-237.
International Search Report and Written Opinion received for PCT Patent Application No. PCT/EP2022/074684, mailed on Nov. 16, 2022, 11 pages.
Iwabuchi et al., "Darstellung und eigenschaften von copolyamiden mit oxyethylengruppen in definierter sequenz", Makromol. Chem and Physics, vol. 183, No. 06, Jun. 15, 1982, pp. 1427-1433.
Iwabuchi et al., Preparation of regularly sequenced polyamides with definite numbers of oxyethylene units and their application as phase transfer catalysts, vol. 184, No. 03, Mar. 1983, pp. 535-543.

* cited by examiner

*Primary Examiner* — Prashant J Khatri
(74) *Attorney, Agent, or Firm* — Faegre Drinker Biddle & Reath LLP

(57) ABSTRACT

The present invention relates to a copolyamide (CoPA) produced by polymerizing a first monomer mixture (M1) and a second monomer mixture (M2), where the second monomer mixture (M2) comprises 1,5-diamino-3-oxapentane. The present invention further relates to polymer film comprising the at least one copolyamide (CoPA) and to a process for producing the polymer film.

17 Claims, No Drawings

COPOLYAMIDE AND POLYMER FILM CONTAINING AT LEAST ONE DIAMINE, A DICARBOXYLIC ACID AND 1,5-DIAMINO-3-OXAPENTANE

CROSS-REFERENCE TO RELATED APPLICATIONS

This application is a National stage application (under 35 U.S.C. § 371) of PCT/EP2022/074684, filed Sep. 6, 2022, which claims benefit of European Application No. 21197339.1, filed Sep. 17, 2021, both of which are incorporated herein by reference in their entirety.

The present invention relates to a copolyamide (CoPA) produced by polymerizing a first monomer mixture (M1) and a second monomer mixture (M2), where the second monomer mixture (M2) comprises 1,5-diamino-3-oxapentane. The present invention further relates to a polymer film comprising the at least one copolyamide (CoPA), to a process for producing the polymer film, and to the use of the polymer film (P) as a packaging film.

Polyamides are of particular importance in industry, since they feature very good mechanical properties and especially have high strength and toughness, good chemical stability, and high abrasion resistance. They are used for example for producing fishing line, climbing rope, and carpet backing. Polyamides also find use in the production of packaging films and packaging sleeves.

An overview of the use as packaging films and packaging sleeves and processes for production thereof is described for example in Encyclopedia of Polymer Science and Engineering 2nd edition, vol. 7, pp. 73-127, vol. 10, pp. 684-695 (John Wiley & Sons, 1987). However, the polyamide films described therein are very stiff and have low tear propagation resistance.

For packaging films and packaging sleeves it is accordingly commonplace to employ copolyamides that combine beneficial properties of different polyamides. The prior art describes various copolyamides.

EP 0 352 562 describes films made of copolyamides, where the copolyamides are produced from E-caprolactam and preferably 1 to 10 parts by weight of a dimer acid and a diamine. The copolyamides can then be used for production of flat or blown films. They are likewise suitable for production of composite films. DE 28 46 596 describes shaped articles made of a copolyamide of caprolactam, fatty acid dimers, and hexamethylenediamine. However, the thermoplastics described cannot be extruded to a film.

U.S. Pat. No. 4,387,184 describes multiphase polyamide compositions. These multiphase polyamide compositions comprise a polyamide matrix and a phase dispersed therein that likewise comprises a polyamide. These multiphase polyamide compositions can be processed into films. A disadvantage of the films described in U.S. Pat. No. 4,387,184 is that they have only low transparency or even none at all and also poor mechanical properties, in particular a high modulus of elasticity and thus high stiffness.

U.S. Pat. No. 5,888,597 discloses a thermoplastic film based on a polymer comprising polyamide and polyether blocks. However, the films have low mechanical stability, consequently they are applied for example to a polyethylene or PVC framework.

EP 0761715 A1 describes films of copolyetheramides for the production of, for example, waterproof rainwear, in which a polyoxyalkylene diamine component having a molecular weight of at least 600 and not more than 6000 is essential in order to achieve the properties of the films of the invention.

It was thus an object of the present invention to provide a polymer film (P) that comprises a polyamide and in which the disadvantages of the polymer films described in the prior art are absent or present only to a reduced degree. The polymer film (P) should also be producible as simply and inexpensively as possible.

It was an object of the present invention to provide a polyamide that is suitable in particular for producing a polymer film in which the disadvantages of the polymer films described in the prior art are absent or present only to a reduced degree. The polymer film should also be producible as simply and inexpensively as possible.

This object was achieved by a copolyamide (CoPA) produced by polymerizing the following components:

(A) 39-95% by weight of at least one first monomer mixture (M1) comprising the components
  (A1) at least one $C_4$-$C_{12}$ dicarboxylic acid, and
  (A2) at least one first $C_4$-$C_{12}$ diamine
  and
(B) 5-61% by weight of a second monomer mixture (M2) comprising the following components:
  (B1) at least one $C_4$-$C_{12}$ dicarboxylic acid and
  (B2) at least one second diamine,
  where component (B2) comprises 1,5-diamino-3-oxapentane and where the percentages by weight of components (A) and (B) are in each case based on the sum total of the percentages by weight of components (A) and (B).

In addition, this object was achieved by a polymer film (P) comprising at least one copolyamide (CoPA) produced by polymerizing the following components:

(A) 39-95% by weight of at least one first monomer mixture (M1) comprising the components
  (A1) at least one $C_4$-$C_{12}$ dicarboxylic acid, and
  (A2) at least one first $C_4$-$C_{12}$ diamine
  and
(B) 5-61% by weight of a second monomer mixture (M2) comprising the following components:
  (B1) at least one $C_4$-$C_{12}$ dicarboxylic acid and
  (B2) at least one second diamine,
  where component (B2) comprises 1,5-diamino-3-oxapentane and where the percentages by weight of components (A) and (B) are in each case based on the sum total of the percentages by weight of components (A) and (B).

It was surprisingly found that the semicrystalline copolyamide (CoPA) of the invention has high permeability to water vapor and exhibits mechanical properties suitable for use in extrusion for the production of permeable packaging.

The polymer film of the invention (P) additionally has high tear strength and also tensile and flexural strength with high permeability to water vapor. In addition, the polymer films (P) of the invention have reduced oxygen permeability compared to the prior art.

The invention is explained in more detail below:

Polymer Film (P)

According to the invention, the polymer film (P) comprises at least one copolyamide (CoPA).

According to the invention, the polymer film (P) comprises at least one copolyamide (CoPA) produced by polymerizing the following components:

(A) 39-95% by weight of at least one first monomer mixture (M1) comprising the components
  (A1) at least one $C_4$-$C_{12}$ dicarboxylic acid, and (A2) at least one first $C_4$-$C_{12}$ diamine and (B) 5-61% by weight of a second monomer mixture (M2) comprising the following components:

(B1) at least one $C_4$-$C_{12}$ dicarboxylic acid and (B2) at least one diamine, where component (B2) comprises 1,5-diamino-3-oxapentane and where the percentages by weight of components (A) and (B) are in each case based on the sum total of the percentages by weight of components (A) and (B).

"At least one copolyamide (CoPA)" is in the context of the present invention understood as meaning either exactly one copolyamide (CoPA) or a mixture of two or more copolyamides (CoPAs).

The at least one copolyamide (CoPA) is described further below.

The polymer film (P) has for example a thickness in the range from 0.1 μm to 1 mm, preferably a thickness in the range from 5 μm to 1 mm, particularly preferably from 5 μm to 500 μm, very particularly preferably from 5 μm to 100 μm, and especially preferably from 7.5 μm to 100 μm. The invention therefore also provides a polymer film (P) in which the polymer film (P) has a thickness in the range from 0.1 μm to 1 mm, preferably a thickness in the range from 5 μm bis 1 mm, particularly preferably from 5 μm to 500 μm, very particularly preferably from 5 μm to 100 μm, and especially preferably from 7.5 μm to 100 μm.

The polymer film (P) may comprise at least one further polymer (FP) in addition to the at least one copolyamide (CoPA).

"At least one further polymer (FP)" means in the context of the present invention either exactly one further polymer (FP) or a mixture of two or more further polymers (FP).

Polymers suitable as the at least one further polymer (FP) are all polymers known to those skilled in the art. It will be apparent that the at least one further polymer (FP) is different than the at least one copolyamide (CoPA).

Preferably, the at least one further polymer (FP) is selected from the group consisting of polyolefins, ethylene-vinyl alcohols, ethylene-vinyl acetates, polyethylene terephthalates, polyvinylidene chlorides, maleic anhydride-grafted polyolefins, polyesters, polyamides, and ionomers. More preferably, the at least one further polymer (FP) is selected from the group consisting of polyolefins, poly(ethylene-vinyl alcohols), poly(ethylene-vinyl acetates), polyethylene terephthalates, polyvinylidene chlorides, polyamide 6, polyamide 6/66, and maleic anhydride-grafted polyolefins. Most preferably, the at least one further polymer (FP) is selected from the group consisting of polyolefins, maleic anhydride-grafted polyolefins, polyamide 6, polyamide 6/66, and ethylene-vinyl alcohols.

When the at least one further polymer (FP) is selected from the group consisting of polyolefins, it is preferable that, in addition, maleic anhydride-grafted polyolefins are used as at least one further polymer (FP). It is possible here that the at least one further polymer (FP) used is a mixture of polyolefins and maleic anhydride-grafted polyolefins. It is likewise possible that, when the polymer film (P) is a multilayer film described further below, the polymer film (P) comprises at least one first further layer of at least one further polymer (FP), where the at least one further polymer (FP) of the first further layer is selected from the group consisting of maleic anhydride-grafted polyolefins and the polymer film (P) comprises at least one second further layer of at least one further polymer (FP), where the at least one further polymer (FP) of the second further layer is selected from the group consisting of polyolefins. In the polymer film (P), the first further layer is in that case present preferably between the first layer comprising the at least one copolyamide (CoPA) and the second further layer.

Polyolefins per se are known to those skilled in the art. Preferred polyolefins are polypropylene (PP), low-density polyethylene (LDPE), linear low-density polyethylene (LLDPE), and very-low-density polyethylene (VLDPE).

Linear low-density polyethylene (LLDPE) is a copolymer of ethylene and at least one $C_4$-$C_8$ α-olefin. Linear low-density polyethylene (LLDPE) is distinguished by long polymer chains having short side chains. The length of the side chains in linear low-density polyethylene (LLDPE) is usually shorter than in low-density polyethylene (LDPE) and in medium-density polyethylene (MDPE). The melting point of linear low-density polyethylene (LLDPE) is preferably in the range from 110 to 130° C.; its density is in the range from 0.91 to 0.93 g/cm$^3$.

Very low-density polyethylenes (VLDPE) are copolymers of ethylene and at least one $C_4$-$C_8$ α-olefin. They typically have a melting point in the range from 110 to 130° C. and a density in the range from 0.86 to <0.91 g/cm$^3$. The proportion of $C_4$-$C_8$ α-olefins in VLDPE is generally higher than in LLDPE.

"$C_4$-$C_8$ α-olefin" is in the context of the present invention understood as meaning linear and branched, preferably linear, alkylenes having 4 to 8 carbon atoms that are unsaturated in the α-position, i.e. having a C—C double bond in the α-position. Examples thereof are 1-butene, 1-pentene, 1-hexene, 1-heptene, and 1-octene. 1-Butene, 1-hexene, and 1-octene are preferred.

Preferred poly(ethylene-vinyl acetates) are copolymers of ethylene with vinyl acetate. For example, they are produced using in the range from 82% to 99.9% by weight of ethylene and in the range from 0.01% to 18% by weight of vinyl acetate, preferably in the range from 88% to 99.9% by weight of ethylene and in the range from 0.01% to 12% by weight of vinyl acetate.

Preferred poly(ethylene-vinyl alcohols) are obtainable by complete or partial hydrolysis of the above-described poly(ethylene-vinyl acetates). The poly(ethylene-vinyl alcohols) comprise for example in the range from 50 to 75 mol % of ethylene and in the range from 25 to 50 mol % of vinyl alcohol, based on the total molar amount of the poly(ethylene-vinyl alcohols).

In the polymer film (P), the at least one further polymer (FP) may be present as a blend (mixture) with the at least one copolyamide (CoPA). Particular preference is given to blends of the at least one copolyamide (CoPA) and polyamide 6 and/or polyamide 6/66.

In addition, it is possible and in accordance with the invention preferable that the polymer film (P) comprises at least one first layer comprising the at least one copolyamide and that the polymer film (P) comprises at least one further layer comprising the at least one further polymer (FP).

In this embodiment, it is preferable that the at least one first layer comprising the at least one copolyamide (CoPA) does not comprise any further polymer (FP).

"At least one first layer" means in the context of the present invention either exactly one first layer or two or more first layers.

"At least one further layer" means in the context of the present invention either exactly one further layer or two or more further layers. Two or more further layers are preferred.

It is thus preferable that the polymer film (P) comprises at least one first layer comprising the at least one copolyamide (CoPA) and that the polymer film (P) additionally comprises at least one further layer, where the at least one further layer comprises at least one further polymer (FP) selected from the group consisting of polyolefins, poly(ethylene-vinyl alcohols), poly(ethylene-vinyl acetates), polyethylene terephthalates, polyvinylidene chlorides, polyamide 6, polyamide 6/66, and maleic anhydride-grafted polyolefins.

The present invention thus also provides a polymer film (P) in which the polymer film (P) comprises at least one first layer comprising the at least one copolyamide (CoPA) and the polymer film (P) comprises at least one further layer, where the at least one further layer comprises at least one further polymer (FP) selected from the group consisting of polyolefins, poly(ethylene-vinyl alcohols), poly(ethylene-vinyl acetates), polyethylene terephthalates, polyvinylidene chlorides, polyamide 6, polyamide 6/66, and maleic anhydride-grafted polyolefins.

When the polymer film (P) does not comprise any further layer aside from the at least one first layer, the polymer film (P) is referred to also as a “monofilm”. When the polymer film (P) is a monofilm, it may comprise exactly one first layer and no further layer; it is likewise possible that it comprises two or more first layers and no further layer. When the polymer film (P) comprises two or more first layers and is a monofilm, the two or more first layers all have the same composition.

When the polymer film (P) comprises at least one first layer comprising the at least one copolyamide (CoPA) and at least one further layer comprising the at least one further polymer (FP), the polymer film (P) is referred to also as a multilayer film.

For example, the polymer film (P) in that case comprises 1 to 11 first layers comprising the at least one copolyamide (CoPA) and 1 to 13 further layers comprising the at least one further polymer (FP). Preferably, the polymer film (P) comprises 1 to 5 first layers comprising the at least one copolyamide (CoPA) and 1 to 11 further layers comprising the at least one further polymer (FP). Especially preferably, the polymer film (P) comprises 1 to 3 first layers comprising the at least one copolyamide (CoPA) and 1 to 7 further layers comprising the at least one further polymer (FP).

In a preferred embodiment of the present invention, the at least one first layer consists of the at least one copolyamide (CoPA). It is likewise preferable that the at least one further layer consists of the at least one further polymer (FP).

The term “polymer film (P)” thus encompasses in the context of the present invention both monofilms and multilayer films.

The present invention therefore also provides a polymer film (P) wherein the polymer film (P) is a monofilm or a multilayer film.

As described above, the polymer film (P) typically has a thickness in the range from 0.1 μm to 1 mm, preferably a thickness in the range from 5 μm bis 1 mm, particularly preferably from 5 μm to 500 μm, very particularly preferably from 5 μm to 100 μm, and especially preferably from 7.5 μm to 100 μm.

When the polymer film (P) is a monofilm and comprises exactly one first layer, the first layer has the same thickness as the polymer film (P), i.e. for example in the range from 0.1 μm to 1 mm, preferably a thickness in the range from 5 μm to 1 mm, particularly preferably from 5 μm to 500 μm, very particularly preferably from 5 μm to 100 μm, and especially preferably from 7.5 μm to 100 μm. When the polymer film (P) is a monofilm and comprises two or more first layers, the thickness of every first layer is less than the thickness of the polymer film (P). The sum total of the thicknesses of the individual first layers in that case generally corresponds to the thickness of the polymer film (P). For example, the at least one first layer comprising the at least one copolyamide (CoPA) in that case has a thickness in the range from 0.1 μm to 100 μm, preferably in the range from 0.5 μm to 100 μm, particularly preferably in the range from 1 to 50 μm, and very particularly preferably in the range from 1.5 to 15 μm.

When the polymer film (P) is a multilayer film, the thickness of the individual layers of the polymer film (P), i.e. the thickness of the at least one first layer comprising the at least one copolyamide (CoPA) and the thickness of the at least one further layer comprising the at least one further polymer (FP), is typically less than the thickness of the polymer film (P). The sum total of the thicknesses of the individual layers in that case generally corresponds to the thickness of the polymer film (P).

For example, the at least one first layer comprising the at least one copolyamide (CoPA) in that case has a thickness in the range from 0.1 μm to 100 μm, preferably in the range from 0.5 μm to 100 μm, particularly preferably in the range from 1 μm to 50 μm, and very particularly preferably in the range from 1.5 μm to 15 μm.

The at least one further layer comprising the at least one further polymer (FP) in that case has a thickness for example in the range from 0.1 μm to 100 μm, preferably in the range from 0.5 μm to 100 μm, particularly preferably in the range from 1 μm to 50 μm, and very particularly preferably in the range from 1.5 μm to 15 μm.

The polymer film (P) may comprise at least one adhesion promoter. This embodiment is preferred when the polymer film (P) is a multilayer film.

“At least one adhesion promoter” means in the context of the present invention either exactly one adhesion promoter or a mixture of two or more adhesion promoters.

When the polymer film (P) is a multilayer film, the at least one adhesion promoter may be present together with the at least one copolyamide (CoPA) in the at least one first layer. It is likewise possible that the at least one adhesion promoter is present together with the at least one further polymer (FP) in the at least one further layer. In addition, it is possible that the at least one adhesion promoter is present as at least one additional layer in the polymer film (P). This embodiment is preferred.

When the at least one adhesion promoter is present as at least one additional layer in the polymer film (P), this at least one additional layer is preferably arranged between the at least one further layer comprising the at least one further polymer (FP) and the at least one first layer comprising the at least one copolyamide (CoPA). The at least one layer of the adhesion promoter has a thickness, for example, of 0.1 μm to 100 μm, preferably in the range from 0.5 μm to 50 μm, and especially preferably in the range from 0.5 μm to 15 μm.

Suitable adhesion promoters are known per se to those skilled in the art. Preferred adhesion promoters are copolymers of ethylene with maleic anhydride or a copolymer of ethylene with vinyl acetate. Preference is given to a copolymer of linear low-density polyethylene (LLDPE) grafted with maleic anhydride or a copolymer of ethylene and vinyl acetate, the copolymer being produced using >18% by weight of vinyl acetate and <82% by weight of ethylene. These copolymers are commercially available, for example under the Bynel 4105 trade name from DuPont or Escorene FL00119 trade name from Exxon.

The polymer film (P) may also comprise additives. Such additives are known to those skilled in the art and are selected for example from the group consisting of stabilizers, dyes, antistats, tackifiers, antiblocking agents, processing aids, antioxidants, light stabilizers, UV absorbers, lubricants, and nucleating aids.

Suitable dyes are organic and inorganic pigments, for example sized titanium dioxide. Suitable tackifiers are for example polyisobutylene (PIB) or ethylene-vinyl acetate (EVA). Suitable antiblocking agents are for example silicon dioxide or calcium carbonate particles. Suitable light stabilizers are for example what are called HALS (hindered amine light stabilizers). Processing aids or lubricants used may for example be ethylenebisstearamide (EBS) wax. Nucleating aids may for example be all kinds of organic or inorganic crystallization nucleating agents, for example talc.

The additives may be present either in the at least one first layer or in the at least one further layer. They may be present in just one of these layers; it is likewise possible that they are present in each of these layers.

Copolyamide (CoPA)

According to the invention, the copolyamide (CoPA) is produced by polymerizing the following components:

(A) 39-95% by weight of at least one first monomer mixture (M1) comprising the components
  (A1) at least one $C_4$-$C_{12}$ dicarboxylic acid, and
  (A2) at least one first $C_4$-$C_{12}$ diamine
  and
(B) 5-61% by weight of a second monomer mixture (M2) comprising the following components:
  (B1) at least one $C_4$-$C_{12}$ dicarboxylic acid and
  (B2) 1,5-diamino-3-oxapentane, where the percentages by weight of components (A) and (B) are in each case based on the sum total of the percentages by weight of components (A) and (B).

The terms "component A" and "monomer mixture (M1)" are used synonymously in the context of the present invention and therefore have the same meaning.

The same applies to the terms "component (B)" and "monomer mixture (M2)". These terms are likewise used synonymously in the context of the present invention and therefore have the same meaning.

According to the invention, the polymer film (P) comprises at least one copolyamide (CoPA).

According to the invention, the at least one copolyamide (CoPA) is produced by polymerizing 39% to 95% by weight of component (A) and 5% to 61% by weight of component (B), preference being given to producing the copolyamide (CoPA) by polymerizing 45% to 95% by weight of component (A) and 5% to 45% by weight of component (B), particular preference being given to producing the copolyamide (CoPA) by polymerizing 50% to 95% by weight of component (A) and 5% to 50% by weight of component (B), and the at least one copolyamide (CoPA) very particularly preferably being produced by polymerizing 60% to 95% by weight of component (A) and 5% to 40% by weight of component (B), where the percentages by weight of components (A) and (B) are in each case based on the sum total of the percentages by weight of components (A) and (B).

Preferably, the sum total of the percentages by weight of components (A) and (B) is 100% by weight.

It will be apparent that the percentages by weight of components (A) and (B) are based on the percentages by weight of components (A) and (B) prior to the polymerization, i.e. when components (A) and (B) have not yet reacted with one another. During the polymerization, the weight ratio of components (A) and (B) may change.

According to the invention, the at least one copolyamide (CoPA) is produced by polymerizing components (A) and (B). The polymerization of components (A) and (B) is known to those skilled in the art. Typically, the polymerization of components (A) and (B) is a condensation reaction. During the polymerization, the components (A1) and (A2) present in component (A) and optionally the component (A3) described further below react both with one another and with the components (B1) and (B2) present in component (B) and with the optional component (B3) described further below that may likewise be present in component (B). Similarly, the components (B1) and (B2) present in component (B) and optionally the component (B3) described further below also react with one another and with the components (A1) and (A2) present in component (A) and with the optional component (A3). This results in the formation of amide bonds between the individual components. The components (A3) and (B3) optionally present are present during the polymerization usually in at least partially open-chain form, i.e. in the form of an amino acid.

The polymerization of components (A) and (B) can take place in the presence of a catalyst. Suitable catalysts are all catalysts known to those skilled in the art that catalyze the polymerization of components (A) and (B). Such catalysts are known to those skilled in the art. Preferred catalysts are phosphorus compounds, for example sodium hypophosphite, phosphorous acid, triphenylphosphine or triphenyl phosphite.

The polymerization of components (A) and (B) results in the formation of the at least one copolyamide (CoPA), which therefore comprises structural units derived from component (A) and structural units derived from component (B). Structural units derived from component (A) comprise structural units derived from components (A1) and (A2) and from optional component (A3), if present; structural units derived from component (B) comprise structural units derived from components (B1) and (B2) and from optional component (B3), if present.

The polymerization of components (A) and (B) results in the formation of the copolyamide (CoPA) as a copolymer. The copolymer may be a random copolymer but it may likewise be a block copolymer. The at least one copolyamide (CoPA) is preferably a random copolymer.

The present invention therefore also provides a polymer film (P) in which the at least one copolyamide (CoPA) is a random copolymer.

In a block copolymer there is formation of blocks of units derived from component (B) and blocks of units derived from component (A). These alternate.

In a random copolymer there is alternation of structural units derived from component (A) with structural units derived from component (B). This alternation occurs randomly; for example, two structural units derived from component (B) may be followed by a structural unit derived from component (A), which is followed in turn by a structural unit derived from component (B), which is then followed by a structural unit comprising three structural units derived from component (A).

The production of the at least one copolyamide preferably comprises the following steps:

a) polymerizing components (A) and (B) to obtain at least one first copolyamide,
b) pelletizing the at least one first copolyamide obtained in step a) to obtain at least one pelletized copolyamide,
c) extracting the at least one pelletized copolyamide obtained in step b) with water to obtain at least one extracted copolyamide,
d) drying the at least one extracted copolyamide obtained in step c) at a temperature ($T_T$) to obtain the at least one copolyamide.

The present invention therefore also provides a polymer film (P) in which the copolyamide (CoPA) is produced in a process comprising the following steps:

a) polymerizing components (A) and (B) to obtain at least one first copolyamide,
b) pelletizing the at least one first copolyamide obtained in step a) to obtain at least one pelletized copolyamide,
c) extracting the at least one pelletized copolyamide obtained in step b) with water to obtain at least one extracted copolyamide,
d) drying the at least one extracted copolyamide obtained in step c) at a temperature ($T_T$) to obtain the at least one copolyamide.

In step b), the at least one first copolyamide obtained in step a) may be pelletized by any methods known to those skilled in the art, for example by strand pelletization or underwater pelletization.

The extraction in step c) may be effected by any methods known to those skilled in the art.

During the extraction in step c), by-products formed in step a) during the polymerization of components (A) and (B) are typically extracted from the at least one pelletized copolyamide, although by-product formation in the process of the invention is so low that this extraction can be omitted. Preferably, step c) is left out and step b) followed immediately by step d).

In step d), the at least one extracted copolyamide obtained in step b) or c) is dried. Processes for drying are known to those skilled in the art. According to the invention, the at least one extracted copolyamide is dried at a temperature ($T_T$). The temperature ($T_T$) is preferably above the at least one glass transition temperature ($T_{G(C)}$) of the at least one copolyamide and below the melting temperature ($T_{M(C)}$) of the at least one copolyamide.

The drying in step d) is typically carried out for a period in the range from 1 to 100 hours, preferably in the range from 2 to 50 hours, and especially preferably in the range from 3 to 40 hours.

It is thought that the drying in step d) further increases the molecular weight of the at least one copolyamide.

The at least one copolyamide (CoPA) typically has at least one glass transition temperature ($T_{G(C)}$). The at least one glass transition temperature ($T_{G(C)}$) is for example in the range from −10° C. to 70° C., preferably in the range from 10° C. to 65° C., and especially preferably in the range from 30° C. to 60° C., determined using ISO 11357-2:2013.

The present invention therefore also provides a polymer film (P) in which the at least one copolyamide (CoPA) has at least one glass transition temperature ($T_{G(C)}$) that is in the range from −10 to 70° C.

In accordance with ISO 11357-2:2013, the glass transition temperature ($T_{G(C)}$) of the at least one copolyamide relates in the context of the present invention to the glass transition temperature ($T_{G(C)}$) of the dry copolyamide.

“Dry” means in the context of the present invention that the at least one copolyamide (CoPA) comprises less than 1% by weight, preferably less than 0.5% by weight, and especially preferably less than 0.1% by weight of water, based on the total weight of the at least one copolyamide (CoPA). More preferably, “dry” means that the at least one copolyamide (CoPA) comprises no water and most preferably that the at least one copolyamide (CoPA) comprises no solvent.

The at least one copolyamide (CoPA) in addition typically has a melting temperature ($T_{M(C)}$). The melting temperature ($T_{M(C)}$) of the at least one copolyamide (CoPA) is for example in the range from 185 to 270° C., preferably in the range from 190 to 260° C., and especially preferably in the range from 200 to 250° C., determined in accordance with ISO 11357-3:2014.

The present invention therefore also provides a polymer film (P) in which the at least one copolyamide (CoPA) has a melting temperature ($T_{M(C)}$), the melting temperature ($T_{M(C)}$) being in the range from 185 to 270° C.

Preferably, the at least one copolyamide (CoPA) does not comprise any polyoxyalkylene groups.

Component (A)

According to the invention, component (A) is a first monomer mixture (M1). The first monomer mixture (M1) comprises components (A1), at least one $C_4$-$C_{12}$ dicarboxylic acid, and (A2), at least one first $C_4$-$C_{12}$ diamine.

A first monomer mixture (M1) is in the context of the present invention understood as meaning a mixture of two or more monomers, where at least components (A1) and (A2) are present in the first monomer mixture (M1).

The terms “component (A)” and “at least one $C_4$-$C_{12}$ dicarboxylic acid” are used synonymously in the context of the present invention and therefore have the same meaning.

The same applies to the terms “component (A2)” and “at least one first $C_4$-$C_{12}$ diamine”. These terms are likewise used synonymously in the context of the present invention and therefore have the same meaning.

The first monomer mixture (M1) comprises for example in the range from 45 to 55 mol % of component (A1) and in the range from 45 to 55 mol % of component (A2), in each case based on the sum total of the mol % of components (A) and (B), preferably based on the total molar amount of the first monomer mixture (M1).

Preferably, component (A) comprises in the range from 47 to 53 mol % of component (A1) and in the range from 47 to 53 mol % of component (A2), in each case based on the sum total of the mol % of components (A1) and (A2), preferably based on the total molar amount of component (A).

More preferably, component (A) comprises in the range from 49 to 51 mol % of component (A1) and in the range from 49 to 51 mol % of component (A2), in each case based on the sum total of the mol % of components (A1) and (A2), preferably based on the total molar amount of component (A).

The present invention therefore also provides a polymer film (P) in which component (A) comprises in the range from 45 to 55 mol % of component (A1) and in the range from 45 to 55 mol % of component (A2), in each case based on the total molar amount of component (A).

The sum total of the mol % of components (A1) and (A2) present in component (A) typically adds up to 100 mol %.

Component (A) may also additionally comprise a component (A3), at least one lactam.

The present invention therefore also provides a polymer film (P) in which component (A) additionally comprises a component (A3), at least one lactam.

The terms “component (A3)” and “at least one lactam” are used synonymously in the context of the present invention and therefore have the same meaning.

When component (A) additionally comprises component (A3), it is preferable that component (A) comprises in the range from 35 to 49.95 mol % of component (A1), in the range from 35 to 49.95 mol % of component (A2), and in the range from 0.1 to 30 mol % of component (A3), in each case based on the total molar amount of component (A).

More preferably, component (A) in that case comprises in the range from 37 to 49.95 mol % of component (A1), in the range from 37 to 49.95 mol % of component (A2), and in the range from 0.1 to 26 mol % of component (A3), in each case based on the total molar amount of component (A).

Most preferably, component (A) in that case comprises in the range from 40 to 49.95 mol % of component (A1), in the range from 40 to 49.95 mol % of component (A2), and in the range from 0.1 to 20 mol % of component (A3), in each case based on the total molar amount of component (A).

When component (A) additionally comprises component (A3), the molar percentages of components (A1), (A2), and (A3) typically add up to 100 mol %.

In one embodiment of the present invention, the first monomer mixture (M1) does not comprise any component (A3), at least one lactam.

It is preferable that the first monomer mixture (M1) does not comprise any polyoxyalkylene groups.

The first monomer mixture (M1) may further comprise water.

Components (A1) and (A2) and any component (A3) of component (A) can react with one another to obtain amides. This reaction is known per se to those skilled in the art. Therefore, component (A) may comprise components (A1) and (A2) and optionally component (A3) in fully reacted form, in partly reacted form or in unreacted form. Preferably, component (A) comprises components (A1), (A2), and any component (A3) in unreacted form.

"In unreacted form" thus means in the context of the present invention that component (A1) is present as the at least one $C_4$-$C_{12}$ dicarboxylic acid and component (A2) as the at least one first $C_4$-$C_{12}$ diamine, and any component (A3) as the at least one lactam.

If components (A1) and (A2) and any (A3) present have at least partly reacted with one another, then components (A1) and (A2) and any (A3) present will be at least partly in amide form.

Component (A1)

According to the invention, component (A1) is at least one $C_4$-$C_{12}$ dicarboxylic acid.

"At least one $C_4$-$C_{12}$ dicarboxylic acid" means in the context of the present invention either exactly one $C_4$-$C_{12}$ dicarboxylic acid or a mixture of two or more $C_4$-$C_{12}$ dicarboxylic acids.

"$C_4$-$C_{12}$ dicarboxylic acid" is in the context of the present invention understood as meaning aliphatic and/or aromatic compounds having 2 to 10 carbon atoms and two carboxyl groups (—COOH groups). The aliphatic and/or aromatic compounds may be unsubstituted or additionally at least monosubstituted. Where the aliphatic and/or aromatic compounds are additionally at least monosubstituted, they may bear one, two or more substituents that do not take part in the polymerization of components (A) and (B). Substituents of this kind are known to those skilled in the art and are for example alkyl or cycloalkyl substituents. Preferably, the at least one $C_4$-$C_{12}$ dicarboxylic acid is unsubstituted.

Suitable components (A1) are selected for example from the group consisting of butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, terephthalic acid, and isophthalic acid.

Preferably, component (A1) is selected from the group consisting of pentanedioic acid (glutaric acid), hexanedioic acid (adipic acid), decanedioic acid (sebacic acid), dodecanedioic acid, terephthalic acid, and isophthalic acid.

The present invention therefore also provides a polymer film (P) in which component (A1) is selected from the group consisting of pentanedioic acid, hexanedioic acid, decanedioic acid, dodecanedioic acid, terephthalic acid, and isophthalic acid.

Especially preferably, component (A1) is hexanedioic acid (adipic acid).

Component (A2)

According to the invention, component (A2) is at least one first $C_4$-$C_{12}$ diamine.

"At least one first $C_4$-$C_{12}$ diamine" means in the context of the present invention either exactly one first $C_4$-$C_{12}$ diamine or a mixture of two or more first $C_4$-$C_{12}$ diamines.

"$C_4$-$C_{12}$ diamine" is in the context of the present invention understood as meaning aliphatic and/or aromatic compounds having 4 to 12 carbon atoms and two amino groups (—$NH_2$ groups).

The aliphatic and/or aromatic compounds may be unsubstituted or additionally at least monosubstituted. Where the aliphatic and/or aromatic compounds are additionally at least monosubstituted, they may bear one, two or more substituents that do not take part in the polymerization of components (A) and (B). Such substituents are for example alkyl or cycloalkyl substituents. These are known per se to those skilled in the art. Preferably, the at least one first $C_4$-$C_{12}$ diamine is unsubstituted.

Suitable components (A2) are selected for example from the group consisting of 1,4-diaminobutane (butane-1,4-diamine; tetramethylenediamine; putrescine), 1,5-diaminopentane (pentamethylene-1,5-diamine; pentane-1,5-diamine; cadaverine), 1,6-diaminohexane (hexamethylene-1,6-diamine; hexane-1,6-diamine), 1,7-diaminoheptane, 1,8-diaminoctane, 1,9-diaminononane, 1,10-diaminodecane (1,10-decamethylenediamine), 1,11-diaminoundecane (1,11-undecamethylenediamine), and 1,12-diaminododecane (1,12-dodecamethylenediamine).

Preferably, component (A2) is selected from the group consisting of butane-1,4-diamine, pentamethylene-1,5-diamine, hexamethylene-1,6-diamine, decamethylene-1,10-diamine, and dodecamethylene-1,12-diamine.

The present invention therefore also provides a polymer film (P) in which component (A2) is selected from the group consisting of butane-1,4-diamine, pentamethylene-1,5-diamine, hexamethylene-1,6-diamine, decamethylene-1,10-diamine, and dodecamethylene-1,12-diamine.

Component (A3)

Component (A) may additionally comprise component (A3), at least one lactam.

"At least one lactam" means in the context of the present invention either exactly one lactam or a mixture of two or more lactams.

Lactams are known per se to those skilled in the art. Preference is given in accordance with the invention to lactams having 4 to 12 carbon atoms.

"Lactams" are understood in the context of the present invention as meaning cyclic amides having preferably 4 to 12 carbon atoms, more preferably 5 to 8 carbon atoms, in the ring.

Suitable lactams are selected for example from the group consisting of 3-aminopropanolactam (propio-3-lactam; β-lactam; β-propiolactam), 4-aminobutanolactam (butyro-4-lactam; γ-lactam; γ-butyrolactam), 5-aminopentanolactam (2-piperidinone; δ-lactam; δ-valerolactam), 6-aminohexanolactam (hexano-6-lactam; ε-lactam; ε-caprolactam), 7-aminoheptanolactam (heptano-7-lactam; ζ-lactam; ζ-heptanolactam), 8-aminooctanolactam (octano-8-lactam; η-lactam; η-octanolactam), 9-aminononanolactam (nonano-9-lactam; θ-lactam; θ-nonanolactam), 10-aminodecanolactam (decano-10-lactam; ω-decanolactam), 11-aminoundecanolactam (undecano-11-lactam; ω-undecanolactam), and 12-aminododecanolactam (dodecano-12-lactam; ω-dodecanolactam).

The present invention therefore also provides a polymer film (P) in which component (A3) is selected from the group consisting of 3-aminopropanolactam, 4-aminobutanolactam, 5-aminopentanolactam, 6-aminohexanolactam, 7-aminoheptanolactam, 8-aminooctanolactam, 9-aminononanolactam, 10-aminodecanolactam, 11-aminoundecanolactam, and 12-aminododecanolactam.

The lactams may be unsubstituted or at least monosubstituted. Where at least monosubstituted lactams are used, the nitrogen atom and/or the ring carbon atoms thereof may bear one, two, or more substituents selected independently of one another from the group consisting of $C_1$ to $C_{10}$ alkyl, $C_5$ to $C_6$ cycloalkyl, and $C_5$ to $C_{10}$ aryl.

Suitable $C_1$ to $C_{10}$ alkyl substituents are for example methyl, ethyl, propyl, isopropyl, n-butyl, sec-butyl, and tert-butyl. A suitable C to $C_6$ cycloalkyl substituent is for example cyclohexyl. Preferred $C_5$ to $C_{10}$ aryl substituents are phenyl and anthranyl.

Preference is given to using unsubstituted lactams, with γ-lactam (γ-butyrolactam), δ-lactam (δ-valerolactam), and ε-lactam (ε-caprolactam) preferred. Particular preference is given to δ-lactam (δ-valerolactam), and ε-lactam (ε-caprolactam), with ε-caprolactam especially preferred.

Component (B)

According to the invention, component (B) is a second monomer mixture (M2). The second monomer mixture (M2) comprises the components (B1), at least one second $C_4$-$C_{12}$ dicarboxylic acid, and (B2), at least one second diamine, where the diamine (B2) comprises 1,5-diamino-3-oxapentane.

A second monomer mixture (M2) is in the context of the present invention understood as meaning a mixture of two or more monomers, where at least components (B1) and (B2) are present in the second monomer mixture (M2).

The second monomer mixture (M2) comprises for example in the range from 45 to 55 mol % of component (B1) and in the range from 45 to 55 mol % of component (B2), in each case based on the sum total of the molar percentages of components (B1) and (B2), preferably based on the total molar amount of the second monomer mixture (M2).

It is preferable that the second monomer mixture (M2) does not comprise any polyoxyalkylene groups.

Preferably, component (B) comprises in the range from 47 to 53 mol % of component (B1) and in the range from 47 to 53 mol % of component (B2), in each case based on the sum total of the molar percentages of components (B1) and (B2), preferably based on the total molar amount of component (B).

More preferably, component (B) comprises in the range from 49 to 51 mol % of component (B1) and in the range from 49 to 51 mol % of component (B2), in each case based on the sum total of the molar percentages of components (B1) and (B2), preferably based on the total molar amount of component (B).

The present invention therefore also provides a polymer film (P) in which component (B) comprises in the range from 45 to 55 mol % of component (B1) and in the range from 45 to 55 mol % of component (B2), in each case based on the total molar amount of component (B).

The sum total of the molar percentages of components (B1) and (B2) present in component (B) normally comes to 100 mol %.

Component (B) may also additionally comprise a component (B3), at least one lactam.

The present invention therefore also provides a polymer film (P) in which component (B) additionally comprises a component (B3), at least one lactam.

The terms "component (B3)" and "at least one lactam" are used synonymously in the context of the present invention and therefore have the same meaning.

When component (B) additionally comprises component (B3), it is preferable that component (B) comprises in the range from 35 to 49.95 mol % of component (B1), in the range from 35 to 49.95 mol % of component (B2), and in the range from 0.1 to 30 mol % of component (B3), in each case based on the total molar amount of component (A).

More preferably, component (B) in that case comprises in the range from 37 to 49.95 mol % of component (B1), in the range from 37 to 49.95 mol % of component (B2), and in the range from 0.1 to 26 mol % of component (B3), in each case based on the total molar amount of component (A).

Most preferably, component (B) in that case comprises in the range from 40 to 49.95 mol % of component (B1), in the range from 40 to 49.95 mol % of component (B2), and in the range from 0.1 to 15 mol % of component (B3), in each case based on the total molar amount of component (B).

When component (B) additionally comprises component (B3), the molar percentages of components (B1), (B2) and (B3) typically add up to 100 mol %.

In one embodiment of the present invention, the second monomer mixture (M2) does not comprise any component (B3), at least one lactam.

Component (B1)

The terms "component (B1)" and "at least one second $C_4$-$C_{12}$ dicarboxylic acid" are used synonymously in the context of the present invention and therefore have the same meaning.

"At least one $C_4$-$C_{12}$ dicarboxylic acid" (B1) means in the context of the present invention either exactly one $C_4$-$C_{12}$ dicarboxylic acid or a mixture of two or more $C_4$-$C_{12}$ dicarboxylic acids.

"$C_4$-$C_{12}$ dicarboxylic acid" is in the context of the present invention understood as meaning aliphatic and/or aromatic compounds having 2 to 10 carbon atoms and two carboxyl groups (—COOH groups). The aliphatic and/or aromatic compounds may be unsubstituted or additionally at least monosubstituted. Where the aliphatic and/or aromatic compounds are additionally at least monosubstituted, they may bear one, two or more substituents that do not take part in the polymerization of components (A) and (B). Substituents of this kind are known to those skilled in the art and are for example alkyl or cycloalkyl substituents. Preferably, the at least one $C_4$-$C_{12}$ dicarboxylic acid is unsubstituted.

Suitable components (B1) are selected for example from the group consisting of butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, terephthalic acid, and isophthalic acid.

Preferably, component (B1) is selected from the group consisting of pentanedioic acid (glutaric acid), hexanedioic acid (adipic acid), decanedioic acid (sebacic acid), dodecanedioic acid, terephthalic acid, and isophthalic acid.

The present invention therefore also provides a polymer film (P) in which component (B1) is selected from the group consisting of pentanedioic acid, hexanedioic acid, decanedioic acid, dodecanedioic acid, terephthalic acid, and isophthalic acid.

Especially preferably, component (B1) is hexanedioic acid (adipic acid).

Component (B2)

These terms "component (B2)" and "at least one lactam" are used synonymously in the context of the present invention and therefore have the same meaning.

"At least one second diamine (B2)" is in the context of the present invention understood as meaning either exactly one diamine (B2) or a mixture of two or more diamines (B2). Preference is given in accordance with the invention to exactly one diamine (B2).

Component (B2) according to the invention comprises 1,5-diamino-3-oxapentane. For example, component (B2) comprises at least 50 mol %, preferably at least 80 mol %, and especially preferably at least 95 mol %, of 1,5-diamino-3-oxapentane, in each case based on the total molar amount of component (B2). Most preferably, component (B2) consists of 1,5-diamino-3-oxapentane.

In addition, component (B2) may comprise further diamines. Suitable further diamines are known per se to those skilled in the art, an example being hexamethylenediamine.

For example, component (B2) comprises in the range from 50 to 99.9 mol % of 1,5-diamino-3-oxapentane and in the range from 0.1 to 50 mol % of hexamethylenediamine, in each case based on the total molar amount of component (B2).

The sum total of the molar percentages of components (B1) and (B2) present in component (B) normally comes to 100 mol %.

More preferably, component (B2) consists of 1,5-diamino-3-oxapentane. In that case, component (B2) comprises no further diamine.

It is therefore preferable that component (B) consists of the components (B1), at least one $C_4$-$C_{12}$ dicarboxylic acid and (B2), 1,5-diamino-3-oxapentane.

Component (B3)

Component (B) may additionally comprise component (B3), at least one lactam.

"At least one lactam" means in the context of the present invention either exactly one lactam or a mixture of two or more lactams.

Lactams are known per se to those skilled in the art. Preference is given in accordance with the invention to lactams having 4 to 12 carbon atoms.

"Lactams" are understood in the context of the present invention as meaning cyclic amides having preferably 4 to 12 carbon atoms, more preferably 5 to 8 carbon atoms, in the ring.

Suitable lactams are selected for example from the group consisting of 3-aminopropanolactam (propio-3-lactam; β-lactam; β-propiolactam), 4-aminobutanolactam (butyro-4-lactam; γ-lactam; γ-butyrolactam), 5-aminopentanolactam (2-piperidinone; δ-lactam; δ-valerolactam), 6-aminohexanolactam (hexano-6-lactam; ε-lactam; ε-caprolactam), 7-aminoheptanolactam (heptano-7-lactam; ζ-lactam; ζ-heptanolactam), 8-aminooctanolactam (octano-8-lactam; η-lactam; η-octanolactam), 9-aminononanolactam (nonano-9-lactam; θ-lactam; θ-nonanolactam), 10-aminodecanolactam (decano-10-lactam; ω-decanolactam), 11-aminoundecanolactam (undecano-11-lactam; ω-undecanolactam), and 12-aminododecanolactam (dodecano-12-lactam; ω-dodecanolactam).

The present invention therefore also provides a polymer film (P) in which component (B3) is selected from the group consisting of 3-aminopropanolactam, 4-aminobutanolactam, 5-aminopentanolactam, 6-aminohexanolactam, 7-aminoheptanolactam, 8-aminooctanolactam, 9-aminononanolactam, 10-aminodecanolactam, 11-aminoundecanolactam, and 12-aminododecanolactam.

The lactams may be unsubstituted or at least monosubstituted. Where at least monosubstituted lactams are used, the nitrogen atom and/or the ring carbon atoms thereof may bear one, two, or more substituents selected independently of one another from the group consisting of $C_1$ to $C_{10}$ alkyl, $C_5$ to $C_6$ cycloalkyl, and $C_5$ to $C_{10}$ aryl.

Suitable $C_1$ to $C_{10}$ alkyl substituents are for example methyl, ethyl, propyl, isopropyl, n-butyl, sec-butyl, and tert-butyl. A suitable $C_5$ to $C_6$ cycloalkyl substituent is for example cyclohexyl. Preferred $C_5$ to $C_{10}$ aryl substituents are phenyl and anthranyl.

Preference is given to using unsubstituted lactams, with γ-lactam (γ-butyrolactam), δ-lactam (δ-valerolactam), and ε-lactam (ε-caprolactam) preferred. Particular preference is given to δ-lactam (δ-valerolactam), and ε-lactam (ε-caprolactam), with ε-caprolactam especially preferred.

Production of the Polymer Film (P)

The polymer film of the invention (P) is preferably produced in a process comprising the following steps:

i) providing at least one copolyamide produced by polymerizing the following components:
   (A) 39-95% by weight of at least one first monomer mixture (M1) comprising the components
      (A1) at least one $C_4$-$C_{12}$ dicarboxylic acid, and
      (A2) at least one first $C_4$-$C_{12}$ diamine
   and
   (B) 5-61% by weight of a second monomer mixture (M2) comprising the following components:
      (B1) at least one $C_4$-$C_{12}$ dicarboxylic acid and
      (B2) at least one second diamine,
   where component (B2) comprises 1,5-diamino-3-oxapentane and where the percentages by weight of components (A) and (B) are in each case based on the sum total of the percentages by weight of components (A) and (B), in molten form, in a first extruder,
ii) extruding the at least one copolyamide provided in step i) in molten form from the first extruder through a die to obtain a film of at least one copolyamide in molten form,
iii) cooling the film of the at least one copolyamide in molten form obtained in step ii), wherein the at least one copolyamide solidifies to obtain the polymer film (P).

The present invention therefore also provides a process for producing the polymer film of the invention (P), comprising the steps of i) providing at least one copolyamide produced by polymerizing the following components:
   (A) 39-95% by weight of at least one first monomer mixture (M1) comprising the components
      (A1) at least one $C_4$-$C_{12}$ dicarboxylic acid, and
      (A2) at least one first $C_4$-$C_{12}$ diamine
   and
   (B) 5-61% by weight of a second monomer mixture (M2) comprising the following components:
      (B1) at least one $C_4$-$C_{12}$ dicarboxylic acid and
      (B2) at least one second diamine,
   where component (B2) comprises 1,5-diamino-3-oxapentane and where the percentages by weight of components (A) and (B) are in each case based on the sum total of the percentages by weight of components (A) and (B), in molten form, in a first extruder, ii) extruding the at least one copolyamide provided in step i) in molten form from the first extruder through a die to obtain a film of at least one copolyamide in molten form, iii) cooling the film of the at least one copolyamide in molten form obtained in step ii), wherein the at least one copolyamide solidifies to obtain the polymer film (P).

In step i), the at least one copolyamide in molten form is provided in a first extruder.

"A first extruder" means in the context of the present invention either exactly one first extruder or two or more first extruders. Usually, as many first extruders are used as the number of first layers comprising the at least one copolyamide that are to be present in the polymer film (P).

If the polymer film (P) is for example to comprise exactly one first layer comprising the at least one copolyamide, then exactly one first extruder is used. If the polymer film (P) is to comprise exactly two first layers comprising the at least one copolyamide, then exactly two first extruders are used. If the polymer film (P) is to comprise exactly five first layers comprising the at least one copolyamide, then exactly five first extruders are used.

For example, 1 to 11 first extruders are used, preferably 1 to 5 first extruders, and more preferably 1 to 3 first extruders.

The elucidations and preferences described above for the at least one copolyamide present in the polymer film (P) apply mutatis mutandis to the at least one copolyamide provided in step i).

According to the invention, the at least one copolyamide is provided in molten form.

"In molten form" means in the context of the present invention that the at least one copolyamide is provided at a temperature above the melting temperature ($T_{M(C)}$) of the at least one copolyamide. "In molten form" thus means that the at least one copolyamide is at a temperature above the melting temperature ($T_{M(C)}$) of the at least one copolyamide. If the at least one copolyamide is in molten form, the at least one copolyamide will be free-flowing.

"Free-flowing" means that the at least one copolyamide can be conveyed in the first extruder and that the at least one copolyamide can be extruded from the first extruder.

For example, the at least one copolyamide is provided in step i) at a temperature in the range from 210 to 340° C., preferably in the range from 240 to 330° C., and especially preferably in the range from 270 to 320° C., in each case assuming that the temperature at which the at least one copolyamide is provided is above the melting temperature ($T_{M(C)}$) of the at least one copolyamide.

The at least one copolyamide can be provided in molten form in the first extruder by any methods known to those skilled in the art.

For example, the at least one copolyamide can be supplied to the first extruder in molten or solid form. If the at least one copolyamide is supplied to the first extruder in solid form, it can be supplied to the first extruder for example in the form of pellets and/or of powder. The at least one copolyamide is in that case melted in the first extruder and thus provided in molten form in the first extruder. This embodiment is preferred.

In addition, it is possible that components (A) and (B) are polymerized directly in the first extruder and hence that the at least one copolyamide is provided in molten form in the first extruder. Processes for this purpose are known to those skilled in the art.

In step ii), the at least one copolyamide in molten form is extruded from the first extruder through a die to obtain a film of the at least one copolyamide in molten form.

A "die" means in the context of the present invention either exactly one die or two or more dies. Preference is given in accordance with the invention to exactly one die.

Suitable dies are all dies known to those skilled in the art that permit extrusion of a film from the at least one copolyamide in molten form. Such dies are for example ring dies or slot dies.

Suitable ring dies and slot dies are known per se to those skilled in the art.

For example, if step i1) described further below is performed, it is preferable that, in step ii), the at least one copolyamide in molten form from the first extruder is brought together in the die, for example in the ring die or in the slot die, with the at least one further polymer (FP) in molten form from the further extruder.

In particular, in step ii), the at least one copolyamide in molten form from the first extruder is brought together in the die with the at least one further polymer (FP) in molten form from the further extruder such that the film of the at least one copolyamide and the at least one further polymer (FP), in each case in molten form, that was obtained in step ii) comprises at least one first layer comprising the at least one copolyamide in molten form and comprises at least one further layer comprising the at least one further polymer (FP) in molten form.

For example, the thickness of the film of the at least one copolyamide in molten form is in the range from 0.1 μm to 1 mm, preferably in the range from 5 μm to 1 mm, particularly preferably from 5 μm to 500 μm, very particularly preferably from 5 μm to 100 μm, and especially preferably from 7.5 μm to 100 μm.

The film of the at least one copolyamide in molten form can be for example a flat film or a tubular film. A tubular film is typically obtained when using a ring die as the die and a flat film when using a slot die as the die.

In step iii), the film of the at least one copolyamide in molten form obtained in step ii) is cooled. This results in solidification of the at least one copolyamide to obtain the polymer film (P).

All methods known to those skilled in the art are suitable for cooling the film of the at least one copolyamide in molten form. For example, the film of the at least one copolyamide in molten form can be cooled by air or water cooling or by contact with a cold surface.

The film of the at least one copolyamide in molten form is in step iii) cooled, for example to a temperature below the melting temperature ($T_{M(C)}$) of the at least one copolyamide, to obtain the polymer film (P). Preferably, the film of the at least one copolyamide in molten form is in step iii) cooled to a temperature below the at least one glass transition temperature ($T_{G(C)}$) of the at least one copolyamide.

For example, the film of the at least one copolyamide in molten form is in step iii) cooled to a temperature in the range from 0 to 100° C., preferably in the range from 10 to 80° C., and especially preferably in the range from 15 to 70° C., where the temperature to which the film of the at least one copolyamide in molten form is cooled is below the melting temperature ($T_{M(C)}$), preferably below the at least one glass transition temperature ($T_{G(C)}$), of the at least one copolyamide.

The present invention therefore also provides a process for producing a polymer film (P) in which, in step (iii), the film of the at least one copolyamide in molten form is cooled to a temperature below the melting temperature ($T_{M(C)}$) of the at least one copolyamide.

The elucidations and preferences described above for the polymer film of the invention (P) apply mutatis mutandis to the polymer film (P) obtained in step iii).

Steps ii) and iii) can be performed one after the other or at the same time.

Preferably, a step i1) is additionally performed in which at least one further polymer (FP) in molten form is provided in a further extruder.

The process for producing the polymer film (P) in that case comprises the following steps:

- i) providing at least one copolyamide produced by polymerizing the following components:
  - (A) 39-95% by weight of at least one first monomer mixture (M1) comprising the components
    - (A1) at least one $C_4$-$C_{12}$ dicarboxylic acid, and
    - (A2) at least one first $C_4$-$C_{12}$ diamine and
  - (B) 5-61% by weight of a second monomer mixture (M2) comprising the following components:
    - (B1) at least one $C_4$-$C_{12}$ dicarboxylic acid and
    - (B2) at least one second diamine, where component (B2) comprises 1,5-diamino-3-oxapentane and where the percentages by weight of components (A) and (B) are in each case based on the sum total of the percentages by weight of components (A) and (B), in molten form, in a first extruder,
- i1) providing at least one further polymer (FP) in molten form in a further extruder,
- ii) extruding the at least one copolyamide provided in step i) in molten form from the first extruder through a die and extruding the at least one further polymer (FP) provided in step i1) in molten form from the further extruder through the die to obtain a film of the at least one copolyamide and the at least one further polymer (FP), in each case in molten form,
- iii) cooling the film of the at least one copolyamide and the at least one further polymer (FP), in each case in molten form, that was obtained in step ii), wherein the at least one copolyamide and/or the at least one further polymer (FP) solidifies to obtain the polymer film (P).

In step i1), the at least one further polymer (FP) in molten form is provided in a further extruder.

"A further extruder" means in the context of the present invention either exactly one further extruder or two or more further extruders. Preference is given to two or more further extruders.

Preferably, as many further extruders are used as the number of further layers comprising the at least one further polymer (FP) that are to be present in the polymer film (P). For example, 1 to 13 further extruders are used, preferably 1 to 11 further extruders, and especially preferably 1 to 7 further extruders.

If the polymer film (P) is for example to comprise exactly one further layer comprising the at least one further polymer (FP), then exactly one further extruder is used. If the polymer film (P) is to comprise exactly two further layers comprising the at least one further polymer (FP), then exactly two further extruders are used. If the polymer film (P) is to comprise exactly five further layers comprising the at least one further polymer (FP), then exactly five further extruders are used.

The elucidations and preferences described above for the further extruder apply mutatis mutandis to the further extruder.

The elucidations and preferences described above for the at least one further polymer (FP) optionally present in the polymer film (P) apply mutatis mutandis to the at least one further polymer (FP).

According to the invention, the at least one further polymer (FP) is provided in step i1) in molten form. "In molten form" means that the at least one further polymer (FP) is provided at a temperature above the melting temperature ($T_{M(FP)}$) of the at least one further polymer (FP). "In molten form" thus means that the at least one further polymer (FP) is at a temperature above the melting temperature ($T_{M(FP)}$) of the at least one further polymer (FP). If the at least one further polymer (FP) is in molten form, the at least one further polymer (FP) will be free-flowing.

"Free-flowing" means that the at least one further polymer (FP) can be conveyed in the further extruder and that the at least one further polymer (FP) can be extruded from the further extruder.

For example, the at least one further polymer (FP) is provided in step i1) at a temperature in the range from 120 to 350° C., preferably in the range from 130 to 300° C., and especially preferably in the range from 140 to 250° C., in each case assuming that the temperature at which the at least one further polymer (FP) is provided is above the melting temperature ($T_{M(FP)}$) of the at least one further polymer (FP).

The at least one further polymer (FP) may be provided in molten form in the further extruder by any methods known to those skilled in the art.

For example, the at least one further polymer (FP) can be supplied to the further extruder in molten or solid form. If the at least one further polymer (FP) is supplied to the further extruder in solid form, it can be supplied to the further extruder, for example, in the form of pellets and/or of powder. The at least one further polymer (FP) is in that case melted in the further extruder and thus provided in molten form in the further extruder.

Step i1) is usually performed at the same time as step i).

The elucidations and preferences described above for steps i), ii), and iii) when step i1) is not performed apply to steps i), ii), and iii) when step i1) is performed.

The film of the at least one copolyamide and the at least one further polymer (FP), in each case in molten form, that was obtained in step ii) comprises the at least one copolyamide in at least one first layer and the at least one further polymer (FP) in at least one further layer. Usually, the film obtained in step ii) comprises as many first layers comprising the at least one copolyamide in molten form as the number of first extruders that have been used in step i) and as many further layers comprising the at least one further polymer (FP) in molten form as the number of further extruders that have been used in step i1).

It will be apparent that, when step i1) is performed, the polymer film (P) obtained in step iii) is a multilayer film.

Preferably, the polymer film (P) is stretched. The polymer film (P) can be stretched after step iii); it is also possible for the polymer film (P) to be stretched during step iii), i.e. during the cooling of the film of the at least one copolyamide and of any at least one further polymer (FP)

The present invention therefore also provides a process in which the following step is additionally performed:

- iv) stretching the polymer film (P) to obtain a stretched polymer film (SP).

Steps iii) and iv) can be performed one after the other or at the same time.

When the polymer film (P) is stretched, the polymer chains of the at least one copolyamide become aligned and the crystallinity of the at least one copolyamide may increase.

It is additionally possible that the polymer chains of any at least one further polymer (FP) present in the polymer film (P) become aligned during the stretching operation. This can increase the crystallinity of the at least one further polymer (FP) too.

The stretching can be effected by any methods known to those skilled in the art.

For example, the polymer film (P) can be stretched by guiding the polymer film (P) across at least one roller, preferably a roller system, or by extending the width of the film. If the polymer film (P) is obtained in tube form, it is also possible for the polymer film (P) to be stretched by blowing air into the tube of the polymer film (P), thereby stretching the polymer film (P). Combinations of processes are of course also possible.

If the polymer film (P) is guided across at least one roller, preferably across a roller system, the polymer film (P) will be stretched in the extrusion direction, i.e. in its length. If the polymer film (P) is on the other hand stretched in its width, it will be stretched perpendicular to the extrusion direction.

If the polymer film (P) undergoes stretching by being guiding across at least one roller, preferably across a roller system, the polymer chains of the at least one copolyamide and of any at least one further polymer (FP) become aligned parallel to the stretching direction. The stretched polymer film (SP) obtained will in that case be uniaxially oriented. Similarly, the stretched polymer film (SP) obtained will be uniaxially oriented when the polymer film (P) is elongated by stretching in its width. In this case too, the polymer chains of the at least one copolyamide and of any at least one further polymer (FP) become aligned parallel to the stretching direction.

"Uniaxially oriented" means that the polymer chains are essentially aligned in one direction.

If the polymer film (P) undergoes stretching by being guided across a roller system and is additionally elongated in its width, the polymer chains of the at least one copolyamide and of any at least one further polymer (FP) become aligned parallel to both directions in which they are stretched. The stretched polymer film (SP) obtained will in that case be biaxially oriented.

"Biaxially oriented" means that the polymer chains are aligned essentially in two different directions, preferably at right angles to one another.

If the polymer film (P) is obtained in tube form and the polymer film (P) is stretched by blowing air into the tube of the polymer film (P), the stretched polymer film (SP) obtained will be uniaxially oriented.

If the above-described processes for stretching the polymer film (P) are combined, the polymer film (P) will be obtained for example in tube form and the polymer film (P) stretched by blowing air into the tube of the polymer film (P) while at the same time being guided across rollers and thereby likewise being stretched, in which case the stretched polymer film (SP) obtained will be biaxially oriented.

The polymer film (P) is typically stretched at a temperature that is above the at least one glass transition temperature ($T_{G(C)}$) of the at least one copolyamide and below the melting temperature ($T_{M(C)}$) of the at least one copolyamide. If the polymer film (P) is a multilayer film, it is in addition preferable that the polymer film (P) is stretched at a temperature below the melting temperature ($T_{M(FP)}$) of the at least one further polymer (FP), especially preferably at a temperature below the melting temperature of the at least one further polymer (FP) melting at the lowest temperature.

The polymer film of the invention (P) can for example be produced in a casting process, in a blowing process, in a biaxially-oriented polyamide film process (BOPA process) or in a multi-blowing process.

The present invention therefore also provides a polymer film (P) that is produced in a casting process, in a blowing process, in a biaxially-oriented polyamide film process or in a multi-blowing process.

The casting process, the blowing process, the biaxially-oriented polyamide film process, and the multi-blowing process are known per se to those skilled in the art. Typically, the polymer film (P) is stretched in these processes, with the result that a stretched polymer film (P) is obtained.

A casting process for producing the polymer film (P) preferably comprises the following steps i-c) to iv-c):

i-c) providing at least one copolyamide produced by polymerizing the following components:
  (A) 39-95% by weight of at least one first monomer mixture (M1) comprising the components
    (A1) at least one $C_4$-$C_{12}$ dicarboxylic acid, and
    (A2) at least one first $C_4$-$C_{12}$ diamine
  and
  (B) 5-61% by weight of a second monomer mixture (M2) comprising the following components:
    (B1) at least one $C_4$-$C_{12}$ dicarboxylic acid and
    (B2) at least one second diamine,
  where component (B2) comprises 1,5-diamino-3-oxapentane and where the percentages by weight of components (A) and (B) are in each case based on the sum total of the percentages by weight of components (A) and (B), in molten form, in a first extruder, ii-c) extruding the at least one copolyamide provided in step i-c) in molten form from the first extruder through a die to obtain a film of the at least one copolyamide in molten form, iii-c) cooling the film of the at least one copolyamide in molten form obtained in step ii-c), wherein the at least one copolyamide solidifies to obtain the polymer film (P), iv-c) stretching the polymer film (P) obtained in step iii-c) by guiding the polymer film (P) across at least one roller, preferably across a roller system, to obtain a stretched polymer film (SP).

The elucidations and preferences described above for steps i) to iii) of the process for producing the polymer film (P) apply mutatis mutandis to steps i-c) to iii-c) of the casting process.

The die used in the casting process in step ii-c) is typically a slot die. The film of the at least one copolyamide in molten form obtained in step ii-c) is therefore preferably a flat film, consequently the polymer film (P) obtained in step iii-c) is preferably a flat film, as is the stretched polymer film (SP) obtained in step iv-c).

In the casting process, steps iii-c) and iv-c) can be performed one after the other or at the same time. In the casting process, steps iii-c) and iv-c) are preferably performed at the same time; steps iii-c) and iv-c) are especially preferably performed at the same time and immediately after step ii-c).

It is also preferable that in the casting process, the at least one roller used in step iv-c), preferably the roller system, is cooled during step iv-c).

A blowing process for producing the polymer film (P) preferably comprises the following steps i-b) to iv-b):

i-b) providing at least one copolyamide produced by polymerizing the following components:

(A) 39-95% by weight of at least one first monomer mixture (M1) comprising the components (A1) at least one $C_4$-$C_{12}$ dicarboxylic acid, and (A2) at least one first $C_4$-$C_{12}$ diamine and (B) 5-61% by weight of a second monomer mixture (M2) comprising the following components:

(B1) at least one $C_4$-$C_{12}$ dicarboxylic acid and (B2) at least one second diamine, where component (B2) comprises 1,5-diamino-3-oxapentane and where the percentages by weight of components (A) and (B) are in each case based on the sum total of the percentages by weight of components (A) and (B), in molten form, in a first extruder, ii-b) extruding the at least one copolyamide provided in step i-b) in molten form from the first extruder through a die, which is a ring die, to obtain a tubular film of the at least one copolyamide in molten form, iii-b) cooling the tubular film of the at least one copolyamide in molten form obtained in step ii-b), wherein the at least one copolyamide solidifies to obtain the polymer film (P), iv-b) stretching the polymer film (P) obtained in step iii-b) by blowing air into the tube of the polymer film (P) to obtain a stretched polymer film (SP).

The elucidations and preferences described above for steps i) to iii) of the process for producing the polymer film (P) apply mutatis mutandis to steps i-b) to iii-b) of the blowing process.

The die used in step ii-b) of the blowing process is preferably a stack dye, a helical distributor dye or a mixed form thereof. These dies are known to those skilled in the art and are described for example in *Blown Film Extrusion* by Kirk Cantor, 2nd edition, Carl Hanser Verlag, Munich 2011.

Steps iii-b) and iv-b) can be performed at the same time or one after the other during the blowing process. In the blowing process, steps iii-b) and iv-b) are preferably performed at the same time.

It will be apparent that, when steps iii-b) and iv-b) are performed at the same time in the blowing process, then in step iii-b) the tubular film of the at least one copolyamide in molten form obtained in step ii-b) will be cooled and at the same time stretched by blowing air into the tubular film to obtain the stretched polymer film (SP).

A biaxially oriented polyamide film process for producing the polymer film (P) preferably comprises the following steps i-o) to iv-o):

i-o) providing at least one copolyamide produced by polymerizing the following components:

(A) 39-95% by weight of at least one first monomer mixture (M1) comprising the components (A1) at least one $C_4$-$C_{12}$ dicarboxylic acid, and (A2) at least one first $C_4$-$C_{12}$ diamine and (B) 5-61% by weight of a second monomer mixture (M2) comprising the following components:

(B1) at least one $C_4$-$C_{12}$ dicarboxylic acid and (B2) at least one second diamine, where component (B2) comprises 1,5-diamino-3-oxapentane and where the percentages by weight of components (A) and (B) are in each case based on the sum total of the percentages by weight of components (A) and (B), in molten form, in a first extruder, ii-o) extruding the at least one copolyamide provided in step i-o) in molten form from the first extruder through a die to obtain a film of the at least one copolyamide in molten form, iii-o) cooling the film of the at least one copolyamide in molten form obtained in step ii-o), wherein the at least one copolyamide solidifies to obtain the polymer film (P), iv-o) stretching the polymer film (P) obtained in step iii-o) by guiding the polymer film (P) across at least one roller, preferably a roller system, and elongating it in its width to obtain the stretched polymer film (SP).

The elucidations and preferences described above for steps i) to iii) of the process for producing the polymer film (P) apply mutatis mutandis to steps i-o) to iii-o) of the biaxially-oriented polyamide film process.

The die used in the biaxially-oriented polyamide film process in step ii-o) is typically a slot die. The film of the at least one copolyamide in molten form obtained in step ii-o) is therefore preferably a flat film, consequently the polymer film (P) obtained in step iii-o) is preferably a flat film, as is the stretched polymer film (SP) obtained in step iv-o).

In the biaxially-oriented polyamide film process, steps iii-o) and iv-o) can be performed one after the other or at the same time, preferably steps iii-o) and iv-o) are performed one after the other. Especially preferably, in the biaxially-oriented polyamide film process, the steps iii-o) and iv-o) are performed one after the other and the polymer film (P) obtained in step iii-o) heated before step iv-o). It is preferable here that the polymer film (P) is before step iv-o) heated to a temperature that is above the at least one glass transition temperature ($T_{G(C)}$) of the at least one copolyamide present in the polymer film (P) and below the melting temperature ($T_{M(C)}$) of the at least one copolyamide present in the polymer film (P). The polymer film (P) is in that case preferably in step iv-o) stretched at the temperature to which it is heated prior to step iv-o).

A multi-blowing process for producing the polymer film (P) preferably comprises the following steps i-m) to iv-m):

i-m) providing at least one copolyamide produced by polymerizing the following components:

(A) 39-95% by weight of at least one first monomer mixture (M1) comprising the components (A1) at least one $C_4$-$C_{12}$ dicarboxylic acid, and (A2) at least one first $C_4$-$C_{12}$ diamine and (B) 5-61% by weight of a second monomer mixture (M2) comprising the following components:

(B1) at least one $C_4$-$C_{12}$ dicarboxylic acid and (B2) at least one second diamine, where component (B2) comprises 1,5-diamino-3-oxapentane and where the percentages by weight of components (A) and (B) are in each case based on the sum total of the percentages by weight of components (A) and (B), in molten form, in a first extruder, ii-m) extruding the at least one copolyamide provided in step i-m) in molten form from the first extruder through a die, which is a ring die, to obtain a tubular film of the at least one copolyamide in molten form, iii-m) cooling the tubular film of the at least one copolyamide in molten form obtained in step ii-m), wherein the at least one copolyamide solidifies to obtain the polymer film (P), iv-m) stretching the polymer film (P) obtained in step iii-m) by blowing air into the tube of the polymer film (P) and at the same time guiding the polymer film (P) across at least one roller, preferably a roller system, to obtain a stretched polymer film (SP).

The elucidations and preferences described above for steps i) to iii) of the process for producing the polymer film (P) apply mutatis mutandis to steps i-m) to iii-m) of the multi-blowing process.

Preferably, the tubular film of the at least one copolyamide in molten form is in step iii-m) cooled in a water bath.

In the multi-blowing process, steps iii-m) and iv-m) can be performed one after the other or at the same time, preferably steps iii-m) and iv-m) are performed one after the other. Especially preferably, the steps iii-m) and iv-m) are performed one after the other and the polymer film (P) obtained in step iii-m) heated before step iv-m). It is preferable here that the polymer film (P) is before step iv-m) heated to a temperature that is above the at least one glass transition temperature ($T_{G(C)}$) of the at least one copolyamide present in the polymer film (P) and below the melting temperature ($T_{M(C)}$) of the at least one copolyamide present in the polymer film (P). The polymer film (P) is in that case preferably in step iv-m) stretched at the temperature to which it is heated prior to step iv-m).

It will be apparent that in the casting process, in the blowing process, in the biaxially-oriented polyamide film process, and in the multi-blowing process, step i1) in which at least one further polymer (FP) is provided in molten form in a further extruder, can optionally also be performed, and that, in that case, in accordance with step ii) of the process for producing the polymer film (P), in step ii-c), in step ii-b), in step ii-o), and in step ii-m) a film of the at least one copolyamide and the at least one further polymer (FP) is obtained, in each case in molten form, and that, in accordance with step iii) of the process for producing the polymer film (P), this is in step iii-c), in step iii-b), in step iii-o), and in step iii-m) cooled.

The elucidations and preferences described above for the optionally performed step i1) of the process for producing the polymer film (P) apply mutatis mutandis to the optionally performed step i1).

In the biaxially-oriented polyamide film process it is preferable that no step i1) is performed. Thus, in the biaxially-oriented polyamide film process it is preferable that no further polymer (FP) in a further extruder is provided.

After it has been produced, the stretched polymer film (P) present can for example be wound. Processes for this purpose are known to those skilled in the art. If the stretched polymer film (SP) is in tube form, such as in the blowing process and the multi-blowing process, the tube can also be slit before winding. A slit film can then be wound onto one or more reels.

Use of the Polymer Film (P)

The polymer film of the invention (P) can be used in all fields known to those skilled in the art in which polymer films are used. In particular, the polymer film of the invention (P) is used as a packaging film.

The present invention therefore also provides for the use of the polymer film of the invention (P) as a packaging film.

The present invention is more particularly elucidated hereinbelow with reference to examples.

EXAMPLES

Molecular weight was determined by gel-permeation chromatography against a poly(methyl methacrylate) standard from Polymer Standard Services GmbH® headquartered in Mainz. The solvent was hexafluoro-2-propanol and the concentration of the polymer on injection onto a styrene-divinylbenzene column was 1.5 mg/ml. The number of theoretical plates was 20 000.

Viscosity numbers of polyamides and copolyamides were determined in a 0.5% by weight solution of phenol/o-dichlorobenzene in a weight ratio of 1:1 at 25° C. in analogous manner to the method described in EN ISO 307:2007+Amd 1:2013.

Glass transition temperatures and melting temperatures were determined according to ISO 11357-1:2009, ISO 11357-2:2013, and ISO 11357-3:2011. This was done by carrying out two heating runs and determining the glass transition temperature and melting temperature on the basis of the second heating run.

The following polymers were used:

Polyamides

R-1 A reference polyamide of adipic acid and pentamethylenediamine was produced by the following method: 235 g of adipic acid, 165 g of pentamethylenediamine, 0.8 g of sodium hypophosphite, and 172 g of water were mixed in a 2 l steel reactor and purged with nitrogen three times. The reactor was then closed, stirred at 100° C. for 30 min and heated further to an external temperature of 270° C. while stirring. The pressure in the reactor reached 20 bar within the first 20 minutes and the reactor was stirred under pressure for a further 60 minutes. Only then was the pressure released and the reactor stirred for a further 60 minutes. The temperature in the reactor reached 260° C. The reactor was charged with a nitrogen pressure of 16 bar, a valve situated at the bottom of the reactor was opened, and the resulting melt strand pelletized after a water bath. The pellets were dried overnight at 80° C.

The polyamide pellets obtained had a molecular weight MW of 58 200, an Mn of 17 100, a viscosity number of 149 ml/g, a glass transition temperature of 56° C., and a melting temperature of 251° C.

R-2 A reference polyamide of adipic acid and hexamethylenediamine was produced by the following method: 223 g of adipic acid, 252 g of a 70% aqueous hexamethylenediamine solution, 0.8 g of sodium hypophosphite, and 97 g of water were mixed in a 2 l steel reactor and purged with nitrogen three times. The reactor was then closed, stirred at 100° C. for 30 min and heated further to an external temperature of 255° C. while stirring. The pressure in the reactor reached 18 bar within the first 10 minutes and the reactor was stirred under pressure for a further 60 minutes. Only then was the pressure released and the reactor stirred for a further 60 minutes. The temperature in the reactor reached 255° C. The reactor was charged with a nitrogen pressure of 9 bar, the temperature increased to 280° C., a valve situated at the bottom of the reactor was opened, and the resulting melt strand pelletized after a water bath. The pellets were dried overnight at 80° C.

The polyamide pellets obtained had a molecular weight MW of 28 400, an Mn of 10 200, a viscosity number of 86 ml/g, a glass transition temperature of 54° C., and a melting temperature of 260° C.

Copolyamides with 1,5-diamino-3-oxapentane:

C-1 A copolyamide of adipic acid, pentamethylenediamine, and 1,5-diamino-3-oxapentane was produced by the following method:

235 g of adipic acid, 131 g of pentamethylenediamine, 33.5 g of 1,5-diamino-3-oxapentane, 0.8 g of sodium hypophosphite, and 171 g of water were mixed in a 2 l steel reactor and purged with nitrogen three times. The reactor was then closed, stirred at 100° C. for 30 min and heated further to an external temperature of 270° C. while stirring. The pressure in the reactor reached 20 bar within the first 10 minutes and the reactor was stirred under pressure for a further 60 minutes. Only then was the pressure released and the reactor stirred for a further 60 minutes. The temperature in the reactor reached 260° C. The reactor was charged with a nitrogen pressure of 16 bar, the temperature increased to 280° C., a valve situated at the bottom of the reactor was opened, and the resulting melt strand pelletized after a water bath. The pellets were dried overnight at 80° C.

The copolyamide pellets obtained had a molecular weight MW of 72 800, an Mn of 18 600, a viscosity number of 159 ml/g, a glass transition temperature of 50° C., and a melting temperature of 242° C.

C-2 A copolyamide of adipic acid, pentamethylenediamine, and 1,5-diamino-3-oxapentane was produced by the following method:

235 g of adipic acid, 98 g of pentamethylenediamine, 67 g of 1,5-diamino-3-oxapentane, 0.8 g of sodium hypophosphite, and 171 g of water were mixed in a 2 l steel reactor and purged with nitrogen three times. The reactor was then closed, stirred at 100° C. for 30 min and heated further to an external temperature of 270° C. while stirring. The pressure in the reactor reached 20 bar within the first 10 minutes and the reactor was stirred under pressure for a further 70 minutes. Only then was the pressure released and the reactor stirred for a further 30 minutes. The temperature in the reactor reached 260° C. The reactor was charged with a nitrogen pressure of 18 bar, a valve situated at the bottom of the reactor was opened, and the resulting melt strand pelletized after a water bath. The pellets were dried overnight at 80° C.

The copolyamide pellets obtained had a molecular weight MW of 85 400, an Mn of 19 000, a viscosity number of 169 ml/g, a glass transition temperature of 46° C., and a melting temperature of 234° C.

C-3 A copolyamide of adipic acid, pentamethylenediamine, and 1,5-diamino-3-oxapentane was produced by the following method:

234 g of adipic acid, 66 g of pentamethylenediamine, 100 g of 1,5-diamino-3-oxapentane, 0.8 g of sodium hypophosphite, and 171 g of water were mixed in a 2 l steel reactor and purged with nitrogen three times. The reactor was then closed, stirred at 100° C. for 30 min and heated further to an external temperature of 270° C. while stirring. The pressure in the reactor reached 20 bar within the first 10 minutes and the reactor was stirred under pressure for a further 65 minutes. Only then was the pressure released and the reactor stirred for a further 30 minutes. The temperature in the reactor reached 270° C. The reactor was charged with a nitrogen pressure of 12 bar, a valve situated at the bottom of the reactor was opened, and the resulting melt strand pelletized after a water bath. The pellets were dried overnight at 80° C.

The copolyamide pellets obtained had a molecular weight MW of 116 000, an Mn of 18 900, a viscosity number of 169 ml/g, a glass transition temperature of 42° C., and a melting temperature of 221° C.

C-4 A copolyamide of adipic acid, hexamethylenediamine, and 1,5-diamino-3-oxapentane was produced by the following method:

225 g of adipic acid, 204 g of 70% by weight aqueous hexamethylenediamine solution, 32 g of 1,5-diamino-3-oxapentane, 0.8 g of sodium hypophosphite, and 111 g of water were mixed in a 2 l steel reactor and purged with nitrogen three times. The reactor was then closed, stirred at 100° C. for 30 min and heated further to an external temperature of 270° C. while stirring. The pressure in the reactor reached 18 bar within the first 10 minutes and the reactor was stirred under pressure for a further 60 minutes. Only then was the pressure released and the reactor stirred for a further 60 minutes. The temperature in the reactor reached 260° C. The reactor was charged with a nitrogen pressure of 16 bar, the temperature increased to 280° C., a valve situated at the bottom of the reactor was opened, and the resulting melt strand pelletized after a water bath. The pellets were dried overnight at 80° C.

The copolyamide pellets obtained had a molecular weight MW of 43 200, an Mn of 14 400, a viscosity number of 113 ml/g, a glass transition temperature of 46° C., and a melting temperature of 241° C.

C-5 A copolyamide of adipic acid, hexamethylenediamine, and 1,5-diamino-3-oxapentane was produced by the following method:

227 g of adipic acid, 154 g of 70% by weight aqueous hexamethylenediamine solution, 65 g of 1,5-diamino-3-oxapentane, 0.8 g of sodium hypophosphite, and 126 g of water were mixed in a 2 l steel reactor and purged with nitrogen three times. The reactor was then closed, stirred at 100° C. for 30 min and heated further to an external temperature of 255° C. while stirring. The pressure in the reactor reached 18 bar within the first 10 minutes and the reactor was stirred under pressure for a further 60 minutes. Only then was the pressure released and the reactor stirred for a further 60 minutes. The temperature in the reactor likewise reached 255° C. during this time. The reactor was charged with a nitrogen pressure of 9 bar, the temperature increased to 280° C., a valve situated at the bottom of the reactor was opened, and the resulting melt strand pelletized after a water bath. The pellets were dried overnight at 80° C.

The copolyamide pellets obtained had a molecular weight MW of 58 200, an Mn of 16 400, a viscosity number of 143 ml/g, a glass transition temperature of 40° C., and a melting temperature of 220° C.

C-6 A copolyamide of adipic acid, hexamethylenediamine, and 1,5-diamino-3-oxapentane was produced by the following method:

229 g of adipic acid, 104 g of 70% by weight aqueous hexamethylenediamine solution, 98 g of 1,5-diamino-3-oxapentane, 0.8 g of sodium hypophosphite, and 141 g of water were mixed in a 2 l steel reactor and purged with nitrogen three times. The reactor was then closed, stirred at 100° C. for 30 min and heated further to an external temperature of 255° C. while stirring. The pressure in the reactor reached 17 bar within the first 10 minutes and the reactor was stirred under pressure for a further 60 minutes. Only then was the pressure released and the reactor stirred for a further 60 minutes. The temperature in the reactor likewise reached 255° C. during this time. The reactor was charged with a nitrogen pressure of 7 bar, the temperature increased to 280° C., a valve situated at the bottom of the reactor was opened, and the resulting melt strand pelletized after a water bath. The pellets were dried overnight at 80° C.

The copolyamide pellets obtained had a molecular weight MW of 70 000, an Mn of 18 700, a viscosity number of 144 ml/g, a glass transition temperature of 37° C., and a melting temperature of 195° C.

The water absorption of the polyamides and copolyamides was measured by the following method:

The pellets of the reference polyamide 5,6 (R1) and the pellets of the inventive copolyamides produced from pentamethylenediamine and 1,5-diamino-3-oxapentane (C1, C2, and C3) were ground. These four powders were then each dried separately overnight at 80° C. and their weight determined as a reference. They were then stored in a climatic chamber at 23° C. and 50% relative humidity (RH) for 2 weeks. The weight after drying and storage was then compared and the % increase in weight calculated:

TABLE 1

| Material | | R1 | C1 | C2 | C3 |
|---|---|---|---|---|---|
| 1,5-Diamino-3-oxapentane content* | [mol %] | | 20 | 40 | 60 |
| Pentamethylenediamine content* | [mol %] | 100 | 80 | 60 | 40 |
| Water absorption at 50% RH | [% by wt.] | 3.6 | 3.9 | 4.2 | 4.7 |

*The sum total of diamines is 100%.

The pellets of the reference polyamide 6,6 (R2) and the pellets of the inventive copolyamides produced from hexamethylenediamine and 1,5-diamino-3-oxapentane (C4, C5, and C6) were ground. These four powders were then each dried separately overnight at 80° C. and their weight determined as a reference. A defined relative humidity (RH) was then established in a desiccator over a saturated saline solution in a closed atmosphere (see Paul Winston, Donald Bates in Ecology 1960, vol. 41, issue 1, pages 232-237). Calcium chloride*6 $H_2O$, sodium nitrite, and potassium chloride salts were used to establish relative humidities of respectively 32.5%, 65.5% and 85% in a desiccator at 20° C. For a saturated relative humidity of 100%, distilled water in a Petri dish at the bottom of the desiccators was used. The weight of the polyamides and inventive copolyamides was measured after drying and after 2 weeks of storage at the established relative humidity and the results converted into % increase in weight:

TABLE 2

| Material | | R2 | C4 | C5 | C6 |
|---|---|---|---|---|---|
| 1,5-Diamino-3-oxapentane content* | [mol %] | | 20 | 40 | 60 |
| Hexamethylenediamine content* | [mol %] | 100 | 80 | 20 | 40 |
| Water absorption at 32.5% RH | [% by wt.] | 2 | 2 | 2 | 3 |
| Water absorption at 65.6% RH | [% by wt.] | 4 | 5 | 6 | 7 |
| Water absorption at 85% RH | [% by wt.] | 4 | 8 | 10 | 14 |
| Water absorption at 100% RH | [% by wt.] | 7 | 23 | 32 | 53 |

*The sum total of diamines is 100%.

The invention claimed is:

1. A copolyamide produced by polymerizing the following components:

(A) 39-95% by weight of at least one first monomer mixture (M1) comprising the components (A1) at least one C4-C12 dicarboxylic acid, and (A2) at least one first C4-C12 diamine (B) 5-61% by weight of a second monomer mixture (M2) comprising the following components:

(B1) at least one C4-C12 dicarboxylic acid and (B2) at least one second diamine, where component (B2) comprises 1,5-diamino-3-oxapentane and where the percentages by weight of components (A) and (B) are in each case based on the sum total of the percentages by weight of components (A) and (B).

2. The copolyamide according to claim 1, wherein component (B2) consists of at least 80 mol % of 1,5-diamino-3-oxapentane.

3. The copolyamide according to claim 1, wherein component (A) comprises in the range from 45 to 55 mol % of component (A1) and in the range from 45 to 55 mol % of component (A2), in each case based on the total molar amount of component (A).

4. The copolyamide according to claim 1, wherein component (B) comprises in the range from 45 to 55 mol % of component (B1) and in the range from 45 to 55 mol % of component (B2), in each case based on the total molar amount of component (B).

5. The copolyamide according to claim 1, wherein component (A1) and component (B1) are each independently selected from the group consisting of pentanedioic acid, hexanedioic acid, decanedioic acid, dodecanedioic acid, terephthalic acid, and isophthalic acid.

6. The copolyamide according to claim 1, wherein component (A2) is selected from the group consisting of butane-1,4-diamine, pentamethylene-1,5-diamine, hexamethylene-1,6-diamine, decamethylene-1,10-diamine, and dodecamethylene-1,12-diamine.

7. The copolyamide according to claim 1, wherein component (A1) is pentanedioic acid and/or hexanedioic acid.

8. The copolyamide according to claim 1, wherein component (B1) is pentanedioic acid and/or hexanedioic acid.

9. The copolyamide according to claim 1, wherein has a glass transition temperature (TG(c)), where the glass transition temperature (TG(c)) in the range from 30° C. to 60° C.

10. The copolyamide according to claim 1, wherein it has a melting temperature (TM(c)), where the melting temperature (TM(c)) is in the range from 185° C. to 270° C.

11. A polymer film (P) comprising at least one copolyamide according to claim 1.

12. The polymer film (P) according to claim 11, wherein the polymer film (P) has a thickness in the range from 0.1 μm to 1 mm.

13. The polymer film (P) according to claim 11, wherein the polymer film (P) is produced in a casting process, in a blowing process, in a biaxially-oriented polyamide film process or in a multi-blowing process.

14. A process for producing a polymer film (P) comprising the steps of i) providing at least one copolyamide according to claim 1 in molten form in a first extruder, ii) extruding the at least one copolyamide provided in step i) in molten form from the first extruder through a die to obtain a film of at least one copolyamide in molten form, iii) cooling the film of the at least one copolyamide in molten form obtained in step ii), wherein the at least one copolyamide solidifies to obtain the polymer film (P).

15. The process for producing a polymer film (P) according to claim 14, wherein it comprises the following additional step:

iv) stretching the polymer film (P) to obtain a stretched polymer film (SP).

16. The process for producing a polymer film (P) according to claim 15, wherein steps (iii) and (iv) are performed one after the other or at the same time.

17. The use of a polymer film (P) according to claim 11 as a packaging film.

* * * * *